(No Model.)
J. STROMVALL.
SAFETY VALVE.
No. 585,132. Patented June 22, 1897.
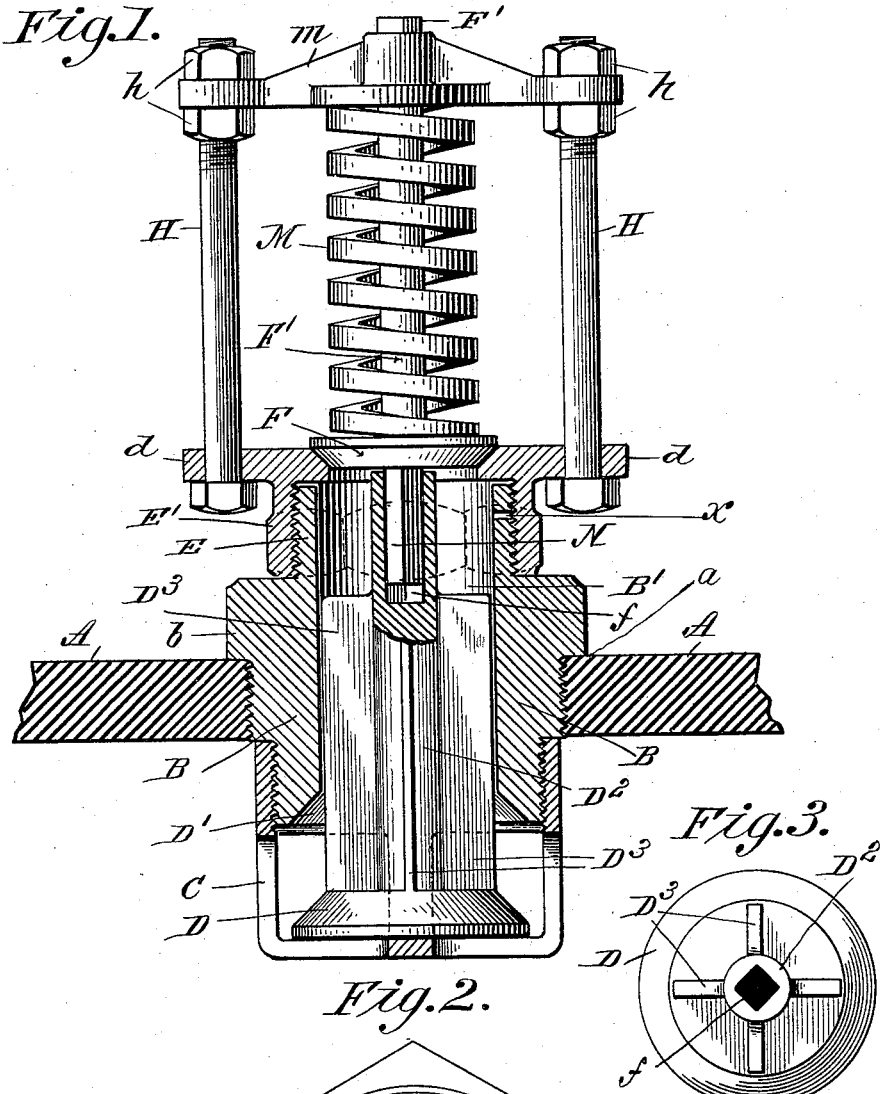
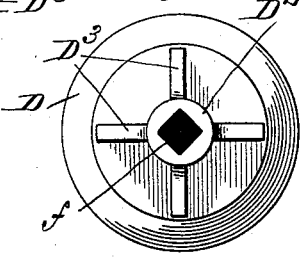
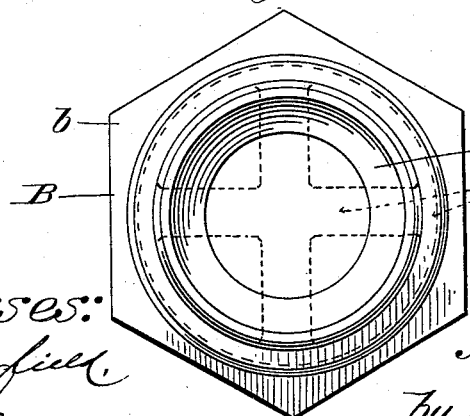
Witnesses:
J. W. Garfield
K. J. Clemons
Inventor
John Stromvall,
by Chapin & Co.
Attorneys.

UNITED STATES PATENT OFFICE.

JOHN STROMVALL, OF SPRINGFIELD, MASSACHUSETTS.

SAFETY-VALVE.

SPECIFICATION forming part of Letters Patent No. 585,132, dated June 22, 1897.

Application filed April 24, 1897. Serial No. 633,599. (No model.)

*To all whom it may concern:*

Be it known that I, JOHN STROMVALL, a citizen of the United States, residing at Springfield, in the county of Hampden and State of Massachusetts, have invented new and useful Improvements in Safety-Valves for Steam-Boilers, of which the following is a specification.

This invention relates to safety-valves for steam-boilers, and particularly to valves, and has for its object the construction of a valve of the class described which will permit the removal thereof for the purpose of grinding the same in its seat while there is steam-pressure in the boiler; and the invention consists in the construction of the valve, as set forth in the following specification, and clearly pointed out in the claims.

In the drawings forming part of this specification, Figure 1 is a vertical section of a valve embodying my invention and a portion of the steam-dome into which it is screwed, the spring and part of the yoke being in elevation. Fig. 2 is a plan view of the bushing which is screwed into the dome, viewed from the end in which the valve-seat is formed. Fig. 3 is a top plan view of the valve placed in said bushing.

Referring to the drawings, A represents a part of the steam-dome of a steam-boiler, and B the bushing, which is screwed into said dome against a shoulder $a$, formed by the hexagon-shaped flange $b$, by which it is screwed into said dome, as shown in Fig. 1. On said bushing, below that part of it which screws into the dome A, a cage C is screwed on for retaining the valve D in operative relation to its seat D', formed in the inner end of said bushing B. That part of said bushing to which the cage C is screwed is made of such diameter that when the cage is screwed on, as shown in Fig. 1, it will pass through the opening in the dome into which the bushing is secured. The position of the cage C is shown in dotted lines in Fig. 2.

A vent-hole $x$ is formed through the neck E of the bushing B, which when the upper valve of the device and its seat-plate are removed, as below described, for regrinding serves to permit steam from within said bushing to escape before the said seat-plate shall be entirely removed from said bushing and to so free the interior of said bushing from pressure as to cause the lower valve D to move quickly against its seat and prevent the escape of steam from the boiler while regrinding said upper valve. Said vent-hole is normally covered and closed by the screw-threaded neck under said valve-seat plate, as shown. Said valve D is provided with a long stem $D^2$, and cast integral with said stem and valve are the wings $D^3$, which bear against the inner surface of the steam-passage B', located centrally in said bushing B, and whereby said valve D is maintained in proper alinement with the axis of said steam-passage. The upper end of said stem $D^2$ projects above the wings some distance, and in said projecting part a square socket $f$ is provided. (See Figs. 1 and 3.) On said bushing, above said hexagonal flange $b$, the neck E is turned down to a proper diameter to receive the plate E', which is screwed onto said neck, the parts being suitably threaded for that purpose. Said plate E' has a valve-seat formed therein in line with the axis of the bushing B, to which seat the valve F is fitted. Suitable lugs $d$ are cast on opposite sides of said plate E', and through suitable holes in said lugs the posts H H are passed, whose heads bear on the under side of said lugs and on the upper ends of which is supported the cross-head $m$, which is adjustable on said post in the usual manner by means of the nuts $h\ h$. Said cross-head $m$ is provided with a hole centrally located between said posts H and in line axially with the bushing B. Through this hole in the cross-head the stem F' of the valve F passes, and between the under side of the cross-head and the valve F is the spiral spring M for holding the said valve in its seat in the plate E' against the pressure of steam in the boiler, the tension of said spring being increased or diminished by the adjustment of the cross-head in the usual manner. I am not necessarily confined to this yoke construction for confining the spring M, as it forms no part of this invention, and any of the other well-known constructions for this purpose may be employed.

On the valve F and in line with the stem F' thereof is the squared projection N, which projects downward from said valve and fits freely in the squared socket $f$ in the end of the valve-stem D² of the valve D. The end of said part N when the valve F is on its seat reaches nearly to the bottom of the socket $f$, and the valve D is thereby prevented from rising far enough to close the latter valve when the valve F is opened to relieve the boiler of excessive pressure of steam therein.

Whenever it becomes necessary to grind the valve F, it can be done without necessitating the blowing off of the boiler and is effected by unscrewing the plate E' from the neck E of the bushing, and as soon as the connection between the two is broken the steam-pressure lifts the valve D to its seat D' and holds it there, preventing the escape of steam from the boiler. The valve F in its yoke may then be ground in the usual manner by the application of a wrench to the squared projection N, by which the valve may be rotated.

This construction offers the great advantage of enabling one to remove the valve of a boiler without interrupting the work of the latter and grinding said valve and seat to a fit without disturbing the relative positions of the parts as they operate when replaced on the bushing B in the steam-dome.

Having thus described my invention, what I claim, and desire to secure by Letters Patent, is—

1. The within-described safety-valve construction consisting of a bushing for connection to a boiler, a valve supported for vertical movement against its seat in the inner end of said bushing, a plate removably secured to the outer end of said bushing, a vent-hole near the outer end of said bushing extending transversely through the side wall thereof, and normally closed by said plate, a valve having a vertical movement toward and from its seat in said plate, a spring for normally holding said valve to its seat, and a sliding connection between the stem of the valve in the lower end of said bushing and the valve in said plate, substantially as described.

2. The within-described safety-valve construction comprising a bushing B, for connection to a boiler, having a valve-seat formed at its inner end, a valve D, operating in said bushing and against said seat, having a socket $f$, in its upper end of rectangular form in cross-section, combined with a second valve F, having a depending stem N, thereon for engagement in said socket, and a supporting-stem extending from the upper side of the valve, a plate E', having a seat therein for said valve F, secured on the outer end of said bushing, a support for said valve F, and a spring holding the same against its seat, substantially as described.

JOHN STROMVALL.

Witnesses:
    H. A. CHAPIN,
    K. I. CLEMONS.